US006838146B2

(12) United States Patent
Merrill et al.

(10) Patent No.: US 6,838,146 B2
(45) Date of Patent: Jan. 4, 2005

(54) VACUUM THERMAL INSULATION PRODUCT AND METHOD FOR MAKING SAME

(76) Inventors: Ezra L. Merrill, 3208 Monterey Ave., SE., Albuquerque, NM (US) 87106; Charles J. Call, 1005 Grove NE., Albuquerque, NM (US) 87110; Kevin Roderick, 2501 Alamo Ave., SE., Albuquerque, NM (US) 87106; Douglas M. Smith, 215 Richmond Ave., SE., Albuquerque, NM (US) 87106; Michael R. Powell, 2718 Kyle Rd., Kennewick, WA (US) 99338

( * ) Notice: Subject to any disclaimer, the term of this patent is extended or adjusted under 35 U.S.C. 154(b) by 40 days.

(21) Appl. No.: 10/237,372

(22) Filed: Sep. 9, 2002

(65) Prior Publication Data

US 2004/0048049 A1 Mar. 11, 2004

(51) Int. Cl.[7] ................ B32B 3/06; F17C 1/12
(52) U.S. Cl. ............... 428/71; 428/69; 428/76; 428/607; 220/592.27; 52/406.3
(58) Field of Search .............. 428/69, 71, 75, 428/76, 607; 220/592.27; 52/406.3

(56) References Cited

U.S. PATENT DOCUMENTS

| | | | |
|---|---|---|---|
| 1,071,817 A | | 9/1913 | Stanley |
| 4,529,638 A | | 7/1985 | Yamamoto et al. |
| 4,745,015 A | * | 5/1988 | Cheng et al. ............ 428/35.8 |
| 5,018,328 A | * | 5/1991 | Cur et al. ............... 52/406.2 |
| 5,084,313 A | * | 1/1992 | Missig et al. ........... 428/35.8 |
| 5,252,408 A | | 10/1993 | Bridges et al. |
| 5,376,424 A | | 12/1994 | Watanabe |
| 5,798,154 A | * | 8/1998 | Bryan .................... 428/35.3 |
| 6,132,837 A | | 10/2000 | Boes et al. |

* cited by examiner

*Primary Examiner*—Jennifer McNeil
(74) *Attorney, Agent, or Firm*—Greenberg Traurig LLP; Mark Krietzman, Esq.

(57) ABSTRACT

A vacuum thermal insulation product is formed of aporous thermal insulation material encased in an evacuated enclosure, with least a portion of the evacuated enclosure including a layer of an electroplated metal.

34 Claims, 2 Drawing Sheets

VACUUM THERMAL INSULATION PRODUCT AND METHOD FOR MAKING SAME

BACKGROUND OF THE INVENTION

1. Field of the Invention

The present invention relates to the chemical arts. In particular the present invention relates to a vacuum thermal insulation product and to a method of making the product.

2. Discussion of the Related Art

Thermal insulation products are used to protect a system of interest from energy flow into or out of the system's surroundings. The use of thermal insulation products are prevalent and range from use in refrigerators (for reduced energy consumption or additional internal volume), in shipping containers containing ice or dry ice used for drugs or food (to extend the lifetime of the shipment), in the tiles on the space shuttle (to protect the shuttle from the heat of reentry into the atmosphere).

Thermal insulation materials are porous materials that have an inherently low thermal conductivity. The lower the thermal conductivity, the lower the heat flow through the insulation for a given temperature difference. Since the thermal conductivity of solids and liquids is much higher than that of gases, insulation, except in very specialized cases, is highly porous. The pores must be sufficiently small (<1 mm), such that free convection due to thermal gradients is minimized.

In the absence of free convection, heat flow through the insulation occurs due to the sum of three components—conduction in the solid matrix, infrared radiation, and conduction in the gas contained in the pores of the matrix. Conduction in the solid matrix is minimized by using a low density (high volume fraction of pores) material. Typically, insulation is between 80 and 98% porous. It is also advantageous to use a solid material that has a low inherent thermal conductivity (i.e., plastics and some ceramics/glasses are better than metals) in order to minimize conduction in the matrix.

The relative importance of radiation depends upon the temperature range of interest and becomes more important for a given insulation as the temperature is increased above ambient temperature and/or the magnitude of the other heat transfer modes are minimized. Opacifiers with high infrared extinction coefficients due to absorption (e.g., carbon black, iron oxide) or scattering (e.g., titania) are often added to high performance insulation. Accordingly, with suppression of free convection, use of a low conductivity, highly porous solid matrix, and control of radiation, the thermal conductivity of the insulation approaches that of the gas contained within the pores of the insulation.

Most thermal insulation materials used today are either fibrous materials, such as fiberglass, mineral wool, and asbestos, or polymer foam materials, such as expanded polystyrene, polyurethane, foamed polyethylene and foamed polypropylene. The fibrous materials have drawbacks related to health and safety. The polymer foams have drawbacks related to flammability, recyclability, and release of environmentally unfriendly gases, such as fluorocarbons or hydrocarbons. In addition, the thermal performances of both classes of materials are on the same order or greater than stagnant air (0.026 W/mK at ambient temperature).

Because of increased concern with energy efficiency and the environment, there has been much interest over the last thirty years in the development of new classes of thermal insulation products that have thermal conductivity much less than that of stagnant air. These new products include gas-filled panels, aerogels, also known as nanoporous silicas and vacuum insulation panels.

There are two general approaches to lower conduction in the gas phase in order to lower the total conductivity of the porous insulation products. The first is to trap gases in the pores that have lower thermal conductivity than that of air. Examples of suitable gases include inert gases such as argon, xenon and krypton, as well as carbon dioxide. Depending upon the gas employed, the thermal conductivity of thermal insulation materials filled with the gas can range from 0.009 to 0.018 W/mK. However, it is a drawback of gas-filled panels that the insulation must be packaged such that the gas does not escape from the pores and atmospheric gases (nitrogen, oxygen) do not penetrate into the pores.

The other means for lowering the conduction in the gas phase is to take advantage of the so-called Knudsen effect. When the mean free path of the gas approaches the pore size of the insulation material, the gas phase conductivity is dramatically reduced. When the mean free path is much larger than the pore size, the gas phase conductivity approaches zero.

The mean free path of atmospheric gases is approximately 60 nanometers (nm) at ambient temperature and pressure. In comparison, the pore size of fibrous materials and polymer foams is typically greater than 10 microns. Consequently, there is no lowering of the conduction of the gas due to the Knudsen effect in these insulation materials.

There are two general approaches to take advantage of the Knudsen effect. The first is to use a material with very small pores and low density. A class of materials that fit this description are aerogels. These materials have small pores (<100 nm) and low density and are the only materials which exhibit total thermal conductivity at ambient pressure which is lower than that of the gas contained within the pores. These materials have thermal conductivity in the range of 0.012 W/mK to 0.025 W/mK. However, they are not in widespread commercial use because of high costs.

The second approach to taking advantage of the Knudsen effect is to encase the insulation material within a vacuum barrier and then to partially evacuate the gas from the pores in the insulation material to form a vacuum insulation panel. This increases the mean free path of the gas by lowering the gas density and lowers the gas phase conduction. At ambient temperature, the thermal conductivity can reach less than 0.002 W/mK. This is an order of magnitude improvement over conventional insulation.

One common approach for encasing vacuum insulation is to use a plastic laminate, a metallized plastic or a metal foil/plastic laminate as the vacuum barrier. Sealing between two sides of the vacuum barrier can be accomplished by heat-sealing the plastic. It is relatively easy to make complex shapes and barrier costs are relatively low. Examples of the use of plastic films are provided in Yamamoto, U.S. Pat. No. 4,529,638. However, these vacuum barrier materials are normally restricted to use at temperatures less than 100° C., because of the increase in barrier permeation rate with temperature of gases such atmospheric nitrogen, oxygen, and water vapor through the plastic. For insulation materials, such as fiberglass, barrier permeation, even at room temperature, is problematic.

Lower gas permeation rates are obtained by using metal foil-based laminates. Examples include aluminum foil-based barriers such as disclosed in Watanabe, U.S. Pat. No.

5,376,424. The thinnest metal foil-based materials include 6 microns of aluminum foil which causes thermal edge effects in panels with the shortest lateral dimension less than 30 cm. Such thermal edge effects cause problems with losses in thermal insulation efficiency (particularly significant with small vacuum panels). When the vacuum barrier layer contains relatively large quantities of thermally conductive metal, energy can flow around the insulation through the barrier and create a thermal short-circuit. The problem is magnified by the fact that a typical barrier material, such as aluminum, can have a thermal conductivity that is over 100,000 times greater than that of the evacuated insulation material. Furthermore, even though metal foil/plastic laminates have excellent gas/vapor permeation resistance over a wide range of temperature, common plastics used for the heat seal layers, such as polyethylene, restrict the use of these barriers to less than 200° C. (even for short lifetimes).

It is also known to encase the insulation in a completely metal barrier envelope. This solution yields excellent product lifetime and the ability of the insulation to be employed at high temperatures. The problems with this approach are two-fold and related. The first is how to seal the barrier around the insulation. The second is how to minimize thermal edge effects. The normal solution is to use a low thermal conductivity metal such as stainless steel and to seal the sides of the barrier by welding. Such an approach is described in Bridges, U.S. Pat. No. 5,252,408. Stainless steel foil is available in thickness down to 12 microns. These foils help to minimize thermal edge effects, but it is difficult to develop leak free welds on foil this thin. Various adhesives and joining materials such as silicones, epoxies, brazes, glasses and ceramics may be used to join the two foil sheets forming the two sides of the vacuum panel. It is difficult to obtain leak-free seals that are stable for long times, are mechanically robust, have high temperature resistance, lend themselves to manufacturing, and do not outgas vapors, solvents, and the like into the vacuum panel.

Another problem with the use of metal foils as a barrier material is that at least one side must be formed to fit around the thermal insulation material. This may cause excessive wrinkling and lead to sealing problems at the seam. This problem becomes more important as the thickness of the vacuum panel increases and for more complex shapes than simple flat panels.

Despite excellent thermal performance, the use of vacuum insulation panels are not widespread because of the high cost of creating the vacuum, lifetime problems associated with maintaining the vacuum (especially at high temperature) and difficulty in producing complex shapes.

Based on the above discussion, it is clear that there is a need for an improved vacuum insulation panel that overcomes many of the disadvantages of the plastic laminate and welded metal foil approaches. Desirable is a vacuum insulation panel which may employ a range of different thermal insulation materials, which may be used over a wide temperature range from cryogenic to high temperature (>900° C.), has a long lifetime, may be produced economically, suffers from minimal thermal edge effects, and may be produced in a range of sizes and shapes.

SUMMARY OF THE INVENTION

Now there has been discovered a new type of high efficiency vacuum thermal insulation product which employs electroplating. The vacuum insulation panel can employ a range of different insulation materials, has high thermal stability over a wide temperature range, from cryogenic to high temperature (>900° C.), has a long lifetime, has low thermal edge effects, thus enabling complex thermal insulation geometries, and may be implemented in a low-cost, efficient process. The vacuum thermal insulation products are useful in the insulation of pipes, electronics, energy sources, appliances, and other uses for which high thermal efficiency is desirable.

The vacuum thermal insulation product includes a porous thermal insulation material encased in an evacuated enclosure, at least a portion of which includes a layer of an electroplated metal, such as electroplated nickel or nickel alloy. The layer of electroplated metal generally has a thickness of from about $1\mu$ to about $50\mu$, with a thickness of from about $10\mu$ to about $25\mu$. being preferred. The evacuated enclosure typically has a pressure of less than about 20 mbar, with pressures less than about 10 mbar being preferred and pressures less than about 5 mbar being more preferred.

Representative porous thermal insulation materials include fiberglass, multi-layer insulation, metallized plastic, plastic foam, precipitated silica, nanoporous silica or combinations thereof, with nanoporous silica being preferred. In some embodiments, the thermal insulation material additionally includes an infra red opacifier or a getter.

In one embodiment, the evacuated enclosure is formed from an intermediate vacuum barrier material having an inner surface and an outer surface with a layer of electroplated metal deposited on the outer surface. Representative vacuum barrier materials include a heat-sealable plastic or a metallized plastic.

In this embodiment, the vacuum thermal insulation product is formed by encasing the thermal insulation material with the intermediate vacuum barrier material to form the enclosure, evacuating the enclosure, and electroplating a layer of a metal on the outer surface of the vacuum barrier material. In preferred embodiments, the thermal insulation material is encased by heat sealing opposing edges of a heat-sealable plastic or a metallized plastic intermediate vacuum barrier material that surrounds the thermal insulation material.

In another embodiment, the evacuated enclosure is formed from a plurality of metal foils, typically two metal foils. The metal foils are preferably made from stainless steel and preferably have a thickness between about 10 and about 250 microns.

Each metal foil is placed adjacent to one of a plurality of portions of the thermal insulation material, such that a gap is formed between the plurality of metal foils. In this embodiment, a layer of electroplated metal is deposited in the gap to join and seal the plurality of metal foils, thus forming the evacuated enclosure.

This vacuum thermal insulation product is made by adhering the plurality of metal foils adjacent to one of the plurality of portions of the thermal insulation material, such that the gap is formed between the plurality of metal foils and then electroplating the layer of the metal in the gap to join and seal the plurality of metal foils and form the enclosure. The enclosure is then evacuated.

Some of these embodiments also include an intermediate vacuum barrier, such as a heat-sealable plastic or a metallized plastic material, disposed between the thermal insulation material and the evacuated enclosure. The vacuum thermal insulation product of such embodiments is formed by encasing the thermal insulation material with the intermediate vacuum barrier material to form the enclosure, adhering the plurality of metal foils adjacent to one of the plurality of portions of the outer surface of the intermediate vacuum barrier material, such that the gap is formed between the plurality of metal foils. The layer of electroplated metal is then deposited in the gap to join and seal the plurality of metal foils and the enclosure is evacuated.

In a further embodiment, the evacuated enclosure is formed from a first metal foil adjacent to a first portion of the thermal insulation material and a second metal foil adjacent to a second portion of the thermal insulation material. The metal foils are preferably made from stainless steel and preferably have a thickness between about 10 and about 250 microns. The two foils surround the entirety of the thermal insulation material, while creating a seam between the foils. The electroplated metal is deposited on the seam and seals the foils to form the evacuated enclosure encasing the thermal insulation material.

These embodiments are made by adhering the first metal foil adjacent to the first portion of a thermal insulation material and adhering the second metal foil adjacent to the second portion of the thermal insulation material, such that the two foils surround the entirety of the thermal insulation material, while creating the seam between the foils. A layer of electroplated metal is deposited on the seam to seal the foils and form the enclosure. The enclosure is then evacuated.

Some of these embodiments also include an intermediate vacuum barrier, such as a heat-sealable plastic or a metallized plastic material, disposed between the thermal insulation material and the evacuated enclosure. These vacuum thermal insulation products are made by encasing the thermal insulation material with the intermediate vacuum barrier material to form an enclosure, adhering the first metal foil adjacent to the first portion of the outer surface of the intermediate vacuum barrier material, and adhering the second metal foil adjacent to the second portion of the outer surface of the intermediate vacuum barrier material, such that the two foils surround the entirety of the intermediate vacuum barrier material, while creating the seam between the foils. The layer of electroplated metal is then deposited on the seam to seal the foils and the enclosure is evacuated. In preferred embodiments, the thermal insulation material is encased by heat sealing opposing edges of a heat-sealable plastic or a metallized plastic intermediate vacuum barrier material that surrounds the thermal insulation material.

DETAILED DESCRIPTION OF THE PREFERRED EMBODIMENTS

For the purpose of promoting an understanding of the principles of the invention, reference will now be made to certain embodiments and specific language will be used to describe the same. It will nevertheless be understood that no limitation of the scope of the invention is thereby intended, such alterations, further modifications and such applications of the principles of the invention as illustrated herein being contemplated as would normally occur to one skilled in the art to which the invention pertains.

The inventive vacuum thermal insulation product is formed of a porous thermal insulation material encased in an evacuated enclosure. Any suitable porous thermal insulation material can be used. Representative thermal insulation materials include fiberglass, such as compacted fiberglass, multi-layer insulation, such as multi-layer insulation formed by alternating layers of thermal insulation material between layers of thin aluminum foil, as sold by Lydall, Inc., Green Island, N.Y., or metallized plastic or plastic foams, such as open cell polystyrene foam as sold by the Dow Chemical Corp., Midland, Mich., or open-cell polyurethane foam, as sold by Huntsman Polyurethanes, Everberg, Belgium, or combinations of such thermal insulating materials.

Of particular utility for this invention are porous thermal insulation materials that have sufficient dimensional stability such that they support the enclosure and do not shrink significantly when the enclosure is evacuated and subjected to atmospheric pressure. Such materials include nanoporous silica, such as nanoporous silica sold by Aspen Aerogels, Inc., Marlborough, Mass., MarkeTech International, Inc., Port Townsend, Wash., the Cabot Corporation, Boston, Mass., and NanoPore Inc., Albuquerque N.Mex.

Conventional vacuum thermal insulation additives can be incorporated into the thermal insulation material. Representative additives include infra red opacifiers, such as carbon black, iron oxide or titania, and getters or desiccants.

Figure 1:
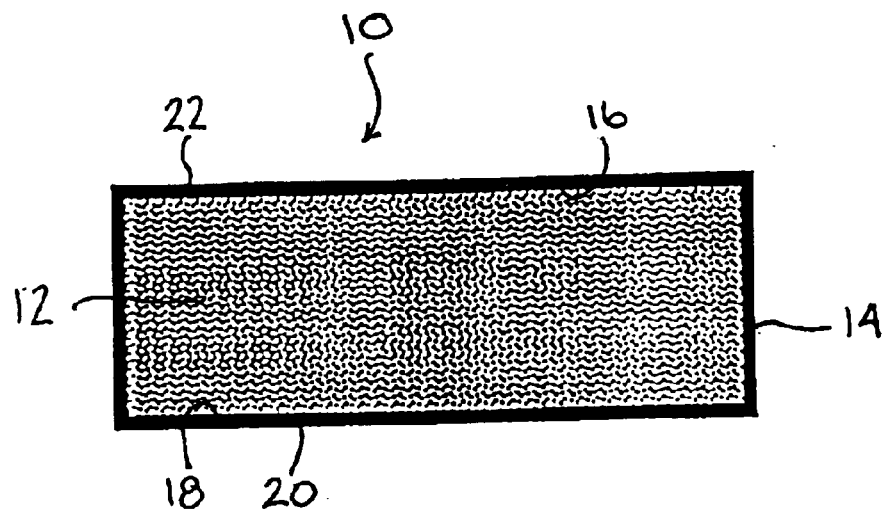
FIG. 1 is a cross-sectional view of a vacuum thermal insulation product in accordance with the invention.

In the embodiment shown in FIG. 1, the evacuated enclosure 10 is formed of an intermediate vacuum barrier material 16 having an inner surface 18 and outer surface 20, with a layer of electroplated metal 22 deposited on the outer surface of the vacuum barrier material. Suitable intermediate vacuum barrier materials include heat-sealable plastic or metallized plastic barrier materials.

In some embodiments, the thermal insulation material 12 is placed in the intermediate vacuum barrier material 16 and the opposing edges of the barrier material are heat sealed to form an airtight enclosure. The thus formed enclosure 14 is then evacuated. Suitable evacuation methods include 1) incorporating heat activated getters into the thermal insulation material and activating the getters once the airtight enclosure is formed, 2) penetrating the enclosure, evacuating and then resealing the enclosure, and 3) building an evacuation tube (not shown) into the enclosure and sealing the evacuation tube after evacuation.

The layer of electroplated metal 22 is deposited on the outer surface of the intermediate vacuum barrier material 20, for example, by electrocatalytic or electroless electroplating, to form a layer that seals the entire vacuum thermal insulation product 10. Preferred electroplated metals include nickel and nickel alloys, because of their relatively low thermal conductivity.

In order to electroplate the metal, the outer surface of the intermediate vacuum barrier material 20 should be electrically conductive. In those embodiments where the vacuum barrier material is a plastic, the outer surface is coated with a with conductive material, such as silver or copper paint, a carbon coating and the like. The coating is applied by suitable wet processing methods, such as by spray or dip coating or by vapor processing methods, such as by sputtering or by vacuum metallizing methods. In those embodiments where the vacuum barrier material is a metallized plastic, the material is oriented so that the electrically conductive, metal layer forms the outer surface.

The electrically conductive enclosure 14 is than immersed in an electrochemical bath containing a soluble salt of the metal to be used for electroplating. In the case of nickel, typical baths contain nickel sulfamate, nickel sulfate or nickel chloride. A thin metal layer then is deposited uniformly on the electrically conductive surface. The thickness of the electroplated metal layer 22 is typically between about $1\mu$ and about $50\mu$, preferably between about $10\mu$ and about $25\mu$.

In an alternative embodiment, the layer of electroplated metal 22 is first deposited on the outer surface of the intermediate vacuum barrier material 20 and then the enclosure 14 evacuated. In this embodiment, the enclosure is evacuated after metal plating through an evacuation port (not shown) that is subsequently sealed. The pressure in the evacuated enclosure is generally less than about 20 mbar, preferably less than about 10 mbar and most preferably less than about 5 mbar.

Figure 3:
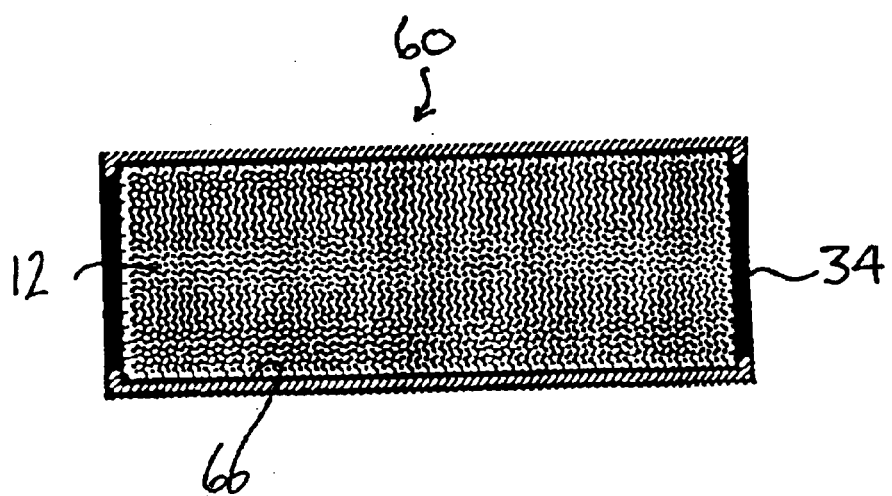
FIG. 3 is a cross-sectional view of a second alternative embodiment of a vacuum thermal insulation product in accordance with the invention.
Figure 2:
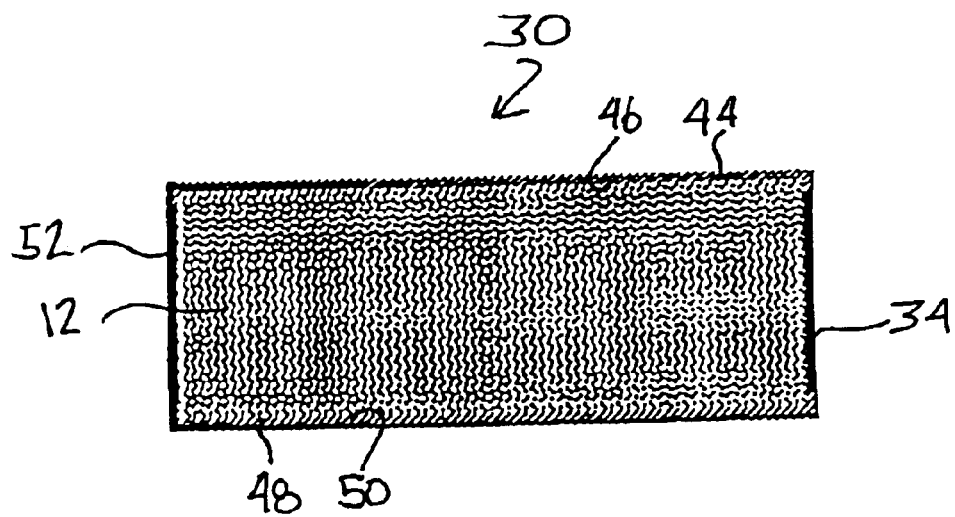
FIG. 2 is a cross-sectional view of a first alternative embodiment of a vacuum thermal insulation product in accordance with the invention.
Figure 4:
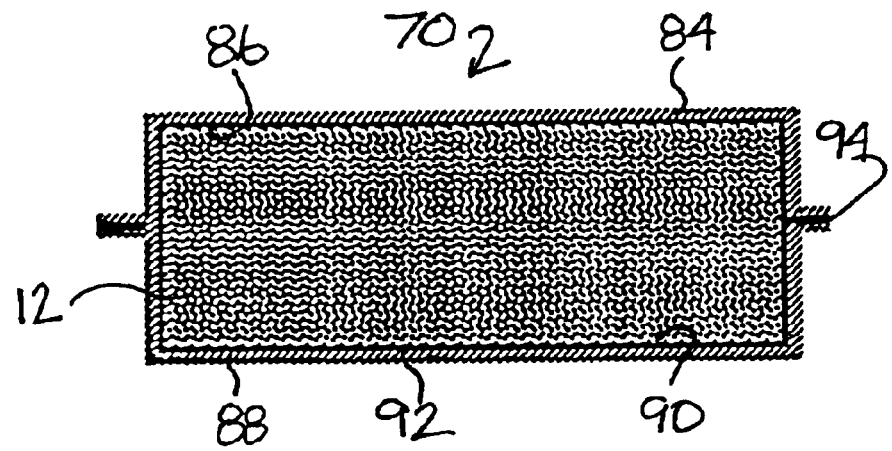
FIG. 4 is a cross-sectional view of a third alternative embodiment of a vacuum thermal insulation product in accordance with the invention.

In the alternative embodiments shown in FIGS. 2, 3, and 4, thin metal foils form the majority of the thin evacuated enclosure. Any suitable metal foil can be used. Representative metal foils include stainless steel, such as 304, having a thickness between about 10 and about 250 microns.

In the first alternative embodiment shown in FIG. 2, a vacuum thermal insulation product 30 is made by encasing the thermal insulation material 12 in an evacuated enclosure 34 formed from a first metal foil 44 adjacent a first portion of the thermal insulation material 46 and a second metal foil 48 adjacent a second portion of the thermal insulation material 50, such that a gap is formed between the metal foils. The surface of the thermal insulation material exposed by the gap is made electrically conductive by using an electrically conductive, water-resistant adhesive.

The metal foils 44 and 48 are masked using an electrically non-conductive and water resistant encapsulant such a electrical tape or plastic sheets, so that only the gap to be joined and sealed by the electroplated material is exposed. A layer of metal 52 is than deposited electrochemically to join the metal foils and form a vacuum tight seal. The water resistant adhesive layer ensures that the plating solution does not penetrate into the porous thermal insulation material.

Air is evacuated from the resulting enclosure 34. For example, the structure can be placed inside an airtight enclosure and then the air removed through an evacuation port (not shown).

FIG. 3 illustrates a second alternative embodiment of a vacuum thermal insulation product in accordance with the invention 60. It differs from the first alternative embodiment in that it includes an intermediate vacuum barrier material 66, such as a heat-sealable plastic or metallized plastic barrier material, disposed between the thermal insulation material 12 and the enclosure 34.

FIG. 4 illustrates a third alternative embodiment of a vacuum thermal insulation product in accordance with the invention 70. In this embodiment, a first metal foil 84 is positioned adjacent to a first portion of a thermal insulation material 86 and a second metal foil 88 is positioned adjacent to a second portion of the thermal insulation material 90, so that the two foils not only surround the entirety of the thermal insulation 12, but so that the periphery of the foils touch one another to create a seam. A water resistant adhesive, such as an epoxy, can be used to bond the metal foils together. Additionally, in the embodiment shown in FIG. 4, an optional layer of an intermediate vacuum barrier material 92 is disposed between the thermal insulation material and the metal foils.

In some of these alternative embodiments, the shapes of the first and second metal foils 84 and 88, respectively are preformed before the foils are positioned adjacent the thermal insulation material 12. The metal foil can be preformed by any suitable method, such as by as by mechanical stamping to yield foils having opposing peripheral flanges. In this embodiment, the metal foils are sealed by applying conductive glue or crimping or mechanically joining the opposing flanges. A thin metal layer 94 is then electrodeposited on the seam to form a vacuum tight seal between the metal foils.

In addition to planar geometries, the vacuum thermal insulation products can also be formed of cylindrical geometries to conform to the size and shape of piping that are widely used to transport fluids in the process industry. In such cases, the insert is pre-shaped to the size (diameter, length) of the piping using suitable molds. In some embodiments, the insulation is performed in the shape of a box to conform to the size and shape of fuel cell components and/or stacks. The encapsulation of such shaped inserts within barrier metal foils, the encapsulation and primary sealing of these foils using adhesives is conducted in a manner similar to that of panels of planar geometries. The shaped vacuum thermal insulation products are subsequently sealed by electroplating.

The products of this invention have use in a wide range of applications including he insulation of 1) oil, steam and process pipes, 2) exhaust systems, 3) aerospace devices, 4) electronic devices, and 5) appliances, such as hot water heaters, refrigerators, and ovens.

When panels are produced in this fashion, thermal conductivity less than 0.006 W/mK at room temperature is achieved. Additionally, the vacuum thermal insulation product can be employed at temperatures from cryogenic temperatures to temperatures greater than 900° C. If used at a temperature above the decomposition temperature of the plastic contained in the intermediate vacuum barrier layer, the plastic will decompose. The decomposition products are then adsorbed by the thermal insulation material and/or getters that may have been added to the thermal insulation material, without adversely affecting the thermal performance of the vacuum thermal insulation product.

While the invention has been described in detail with reference to certain preferred embodiments thereof, it will be understood that modifications and variations are within the spirit and scope of that which is described and claimed.

We claim:

1. A vacuum thermal insulation product comprising:
    a porous thermal insulation material selected from the group consisting essentially of fiberglass, multi-layer insulation, metallized plastic, plastic foam, precipitated silica, nanoporous silica, or combinations thereof;
    a heat-sealable plastic or a metallized plastic intermediate vacuum barrier material having an inner surface and an outer surface encasing the thermal insulation material to form an evacuated enclosure encasing the thermal insulation, the enclosure having a pressure of less than about 10 mbar; and
    a layer of electroplated nickel or nickel alloy deposited on the outer surface of the vacuum barrier material, the layer having a thickness of from about $10\mu$ and about $25\mu$.

2. A vacuum thermal insulation product comprising:
    a porous thermal insulation material;
    a plurality of metal foils, each metal foil placed adjacent to one of a plurality of portions of the thermal insulation material, such that a gap is formed between the plurality of metal foils; and a layer of electroplated metal deposited in the gap joining and sealing the plurality of metal foils to form an evacuated enclosure encasing the thermal insulation material.

3. The vacuum thermal insulation product in accordance with claim 2 wherein there are two metal foils.

4. The vacuum thermal insulation product in accordance with claim 3 wherein the thermal insulation material additionally comprises an infra rod opacifier or a getter.

5. The vacuum thermal insulation product in accordance with claim 2 wherein the metal foils are made of stainless steel.

6. The vacuum thermal insulation product in accordance with claim 5 wherein the metal foils have a thickness between about 10 and about 250 microns.

7. The vacuum thermal insulation product in accordance with claim 2 further comprising an intermediate vacuum barrier material disposed between the thermal insulation material and the evacuated enclosure.

8. The vacuum thermal insulation product in accordance with claim 7 wherein the intermediate vacuum barrier material is a heat-sealable plastic or a metallized plastic material.

9. The vacuum thermal insulation product in accordance with claim 2 wherein the thermal insulation material is fiberglass, multi-layer insulation, metallized plastic, plastic foam, precipitated silica, nanoporous silica or combinations thereof.

10. The vacuum thermal insulation product in accordance with claim 2 wherein the thermal insulation material is nanoporous silica.

11. The vacuum thermal insulation product in accordance with claim 2 wherein the electroplated metal is nickel or a nickel alloy.

12. The vacuum thermal insulation product in accordance with claim 11 wherein the layer of electroplated metal has a thickness of from about $1\mu$ to about $50\mu$.

13. The vacuum thermal insulation product in accordance with claim 11 wherein the layer of electroplated metal has a thickness of from about $10\mu$ to about $25\mu$.

14. The vacuum thermal insulation product in accordance with claim 2 wherein the enclosure has a pressure of less than about 20 mbar.

15. The vacuum thermal insulation product in accordance with claim 2 wherein the enclosure has a pressure of less than about 10 mbar.

16. The vacuum thermal insulation product in accordance with claim 2 wherein the enclosure has a pressure of less than about 5 mbar.

17. A vacuum thermal insulation product comprising:

a porous thermal insulation material selected from the group consisting essentially of fiberglass, multi-layer insulation, metallized plastic, plastic foam, precipitated silica, nanoporous silica or combinations thereof;

a first stainless steel foil having a thickness between about 10 and about 250 microns adjacent to a first portion of the thermal insulation material;

a second stainless steel foil having a thickness between about 10 and about 250 microns adjacent to a second portion of the thermal insulation material, such tat a gap is formed between the first and second metal foils; and a layer of electroplated nickel or nickel alloy having a thickness of from about $10\mu$ to about $25\mu$ deposited in the gap joining and sealing the metal foils to form an evacuated enclosure encasing the thermal insulation material, the evacuating enclosure having a pressure of less than about 10 mbar.

18. A vacuum thermal insulation product comprising:

a porous thermal insulation material selected from the group consisting essentially of fiberglass, multi-layer insulation, metallized plastic, plastic foam, precipitated silica, nanoporous silica or combinations thereof;

a first stainless steel foil having a thickness between about 10 and about 250 microns adjacent to a first portion of the thermal insulation material;

a second stainless steel foil having a thickness between about 10 and about 250 microns adjacent to a second portion of the thermal insulation material, such that a gap is formed between the metal foils;

a layer of electroplated nickel or nickel alloy having a thickness of from about $10\mu$ to about $25\mu$ deposited in the gap joining and sealing the first and second metal foils to form an evacuated enclosure encasing the thermal insulation material, the evacuating enclosure having a pressure of less than about 10 mbar; and a heat-sealable plastic or metallized plastic barrier material disposed between the thermal insulation material and the evacuated enclosure.

19. A vacuum thermal insulation product comprising:

a porous thermal insulation material;

a first metal foil adjacent to a first portion of the thermal insulation material;

a second metal foil adjacent to a second portion of the thermal insulation material, such that the first and second metal foils surround the entirety of the thermal insulation material, while creating a seam between the first and second metal foils; and a layer of electroplated metal deposited on the seam and sealing the foils to form an evacuated enclosure encasing the thermal insulation material.

20. The vacuum thermal insulation product in accordance with claim 19 wherein the first and second metal foils are made of stainless steel.

21. The vacuum thermal insulation product in accordance with claim 20 wherein the thermal insulation material additionally comprises an infrared opacifier or a getter.

22. The vacuum thermal insulation product in accordance with claim 20 wherein the first and second metal foils have a thickness between about 10 and about 250 microns.

23. The vacuum thermal insulation product in accordance wit claim 19 further comprising an intermediate vacuum barrier material disposed between the thermal insulation material and the evacuated enclosure.

24. The vacuum thermal insulation product in accordance with claim 23 wherein the intermediate vacuum barrier material is a heat-sealable plastic or a metallized plastic material.

25. The vacuum thermal insulation product in accordance with claim 19 wherein the thermal insulation material is fiberglass, multi-layer insulation, metallized plastic, plastic foam, precipitated silica, nanoporous silica or combinations thereof.

26. The vacuum thermal insulation product in accordance with claim 19 wherein the thermal insulation material is nanoporous silica.

27. The vacuum thermal insulation product in accordance with claim 19 wherein the electroplated metal is nickel or a nickel alloy.

28. The vacuum thermal insulation product in accordance with claim 27 wherein the layer of electroplated metal has a thickness of from about $1\mu$ to about $50\mu$.

29. The vacuum thermal insulation product in accordance with claim 27 wherein the layer of electroplated metal has a thickness of from about $10\mu$ to about $25\mu$.

30. The vacuum thermal insulation product in accordance with claim 19 wherein the enclosure has a pressure of less than about 20 mbar.

31. The vacuum thermal insulation product in accordance with claim 19 wherein the enclosure has a pressure of less than about 10 mbar.

32. The vacuum thermal insulation product in accordance with claim 19 wherein the enclosure has a pressure of less than about 5 mbar.

33. A vacuum thermal insulation product comprising:
- a porous thermal insulation material selected from the group consisting essentially of fiberglass, multi-layer insulation, metallized plastic, plastic foam, precipitated silica, nanoporous silica or combinations thereof;
- a first stainless steel foil having a thickness between about 10 and about 250 microns adjacent to a first portion of the thermal insulation material;
- a second stainless steel foil having a thickness between about 10 and about 250 microns adjacent to a second portion of the thermal insulation material, such that the first and second metal foils surround the entirety of the thermal insulation, while creating a seam between the first and second metal foils; and
- a layer of electroplated nickel or nickel alloy having a thickness of from about $10\mu$ to about $25\mu$ deposited on the seam to form an evacuated enclosure encasing the thermal insulation material, the evacuating enclosure having a pressure of less than about 10 mbar.

34. A vacuum thermal insulation product comprising:
- a porous thermal insulation material selected from the group consisting essentially of fiberglass, multi-layer insulation, metallized plastic, plastic foam, precipitated silica, nanoporous silica or combinations thereof;
- a first stainless steel foil having a thickness between about 10 and about 250 microns adjacent to a first portion of the thermal insulation material;
- a second stainless steel foil having a thickness between about 10 and about 250 microns adjacent to a second portion of the thermal insulation material, such that the first and second metal foils surround the entirety of the thermal insulation, while creating a seam between the foils; and
- a layer of electroplated nickel or nickel alloy having a thickness of from about $10\mu$ to about $25\mu$ deposited in the gap joining and sealing the first and second metal foils to form an evacuated enclosure encasing the thermal insulation material, the evacuating enclosure having a pressure of less than about 10 mbar; and
- a heat-sealable plastic or metallized plastic barrier material disposed between the thermal insulation material and the evacuated enclosure.

* * * * *